United States Patent [19]

Latsch et al.

[11] 4,064,846

[45] Dec. 27, 1977

[54] METHOD AND APPARATUS FOR CONTROLLING AN INTERNAL COMBUSTION ENGINE

[75] Inventors: Reinhard Latsch, Vaihingen; Valerio Bianchi, Hochdorf, both of Germany

[73] Assignee: Robert Bosch GmbH, Stuttgart, Germany

[21] Appl. No.: 659,495

[22] Filed: Feb. 19, 1976

[30] Foreign Application Priority Data

Feb. 19, 1975 Germany .............................. 2507055

[51] Int. Cl.² .............................................. F02B 3/04
[52] U.S. Cl. ............................ 123/32 EA; 123/117 D
[58] Field of Search ......... 123/32 EA, 117 R, 117 D; 122/32 EE

[56] References Cited

U.S. PATENT DOCUMENTS

| | | | |
|---|---|---|---|
| 3,430,616 | 3/1969 | Glockler et al. | 123/32 EA |
| 3,757,750 | 9/1973 | Ohtani | 123/32 EA |
| 3,900,013 | 8/1975 | Vignozzi et al. | 123/32 EA |
| 3,991,726 | 11/1976 | Kawai et al. | 123/32 EA |

*Primary Examiner*—Samuel Feinberg
*Attorney, Agent, or Firm*—Edwin E. Greigg

[57] ABSTRACT

A control apparatus for an internal combustion engine performs cyclic modulations of an operational parameter of the engine, for example by periodic leaning out of the fuel-air mixture to some of the engine's cylinders. The resulting changes in angular acceleration of the crankshaft are sensed by an electro-inductive transducer and the elapsed time between successive pulses so generated is measured. Depending on whether the change in acceleration is positive or negative, the circuit generates an appropriate control signal which may be used to steer a final control element which moves the center of modulation, i.e., the operational point of the engine, toward an optimum value of, for example, the fuel-air ratio.

19 Claims, 9 Drawing Figures

METHOD AND APPARATUS FOR CONTROLLING AN INTERNAL COMBUSTION ENGINE

BACKGROUND OF THE INVENTION

The invention relates to a method and apparatus for controlling the operation of an internal combustion engine so as to provide maximum power or minimum fuel consumption for the prevailing operational conditions. This optimization procedure is obtained by causing fluctuations of engine variables, for example the fuel quantity, the ignition angle, the air quantity or the like, and by sensing the resulting relative changes in the operation of the engine, for example in the crankshaft rotation. The center of the fluctuations of the engine variable is then adjusted in dependence on a comparison process.

A process and apparatus of the general type described above are known in which a mechanism for an automatic control of the internal combustion engine changes an engine variable continuously and relatively slowly within narrow limits. In this apparatus, an accelerometer is connected to the crankshaft of the engine and measures positive and negative accelerations. The signals from the accelerometer and the signals from the device causing a slow change in the engine variable are fed to a servo motor which changes the engine variable to correspond to the received signals.

It is a disadvantage of the above-described known method that it is very difficult to distinguish the forced modulation of the engine variable from the total positive or negative acceleration as measured by the accelerometer since, in normal operation, an internal combustion engine is nearly always subject to accelerations, so that the particular engine variables considered are almost continuously subjected to changes, for example by the operator himself, by braking, application of the gas pedal and the like. In addition, the known control method is not sufficiently rapid.

OBJECT AND SUMMARY OF THE INVENTION

It is an object of the present invention to provide a controller which provides an unequivocal control process which causes the engine variable to lie in its optimum domain. It is a further object of the invention to provide a method for the automatic control of an internal combustion engine which causes the engine to deliver optimum power at all times and which is simple to embody at the same time as being insensitive to variations in the tested engine function which are not related to the arbitrary superimposed modulation. Yet another object of the invention is to provide a method which operates rapidly and reliably. It is a further principal object of the invention to provide an apparatus for carrying out the above-described method.

These and other objects are attained by the invention by providing that the oscillating fluctuation of a particular engine variable occurs at a frequency which is equal to and synchronous with the rotational engine speed. The invention further provides utilizing changes in the crankshaft acceleration as a measure for optimum adjustment of other engine variables.

Following this method, one obtains the advantage that the control process responds precisely to only those changes in engine operation and function which are actually due to the superimposed modulation and not those connected to some other changes of the operational conditions which may be due, for example, to uniform acceleration or other normal conditions of engine operation to which the known apparatus would, unfortunately, be responsive. Furthermore, the control process according to the invention is spontaneous and immediate and the control response is increased at high r.p.m. because the control modulation frequency of the engine variable is forced into synchronization with the rotational speed of the engine (r.p.m.).

The invention provides a sensor which, preferably inductively, generates a signal proportional to the speed of rotation of the crankshaft and this signal is differentiated twice so as to obtain a measure of the changes in acceleration of the crankshaft. This measure is related exclusively to the superimposed modulation of an engine variable. The phase of this twice differentiated signal is compared with the modulation signal. The output of the phase comparator is preferably integrated so as to obtain a control signal which can be used to influence the engine variable in simple manner since only its sign is of significance.

It is preferred that the signals used be substantially of digital character and, since the phase shift must be either 0 or 180°, the comparison of phase may be performed by a multiplicative process in a digital multiplier.

The invention will be better understood and further objects and advantages thereof become more apparent from the ensuing detailed description of the method according to the invention and of preferred embodiments of apparatus for carrying out this method, taken in conjunction with the drawing.

DESCRIPTION OF THE PREFERRED EMBODIMENT

It is a stated principal object of the invention to control internal combustion engines, for example an Otto-engine, using a maximum value control process. This maximum value may be either the maximum engine power or the minimum fuel consumption or, again, the optimum ignition angle for maximum power. Normally, these magnitudes are definitely dependent on such other variables as the air and fuel properties, the engine r.p.m., the induction tube pressure, the compression ratio and the like. In the present invention, the control process is to take place in such a manner that, for any given operational conditions, the engine is to provide its maximum power or is to be operated at minimum fuel consumption as a matter of principle.

Figure 1:
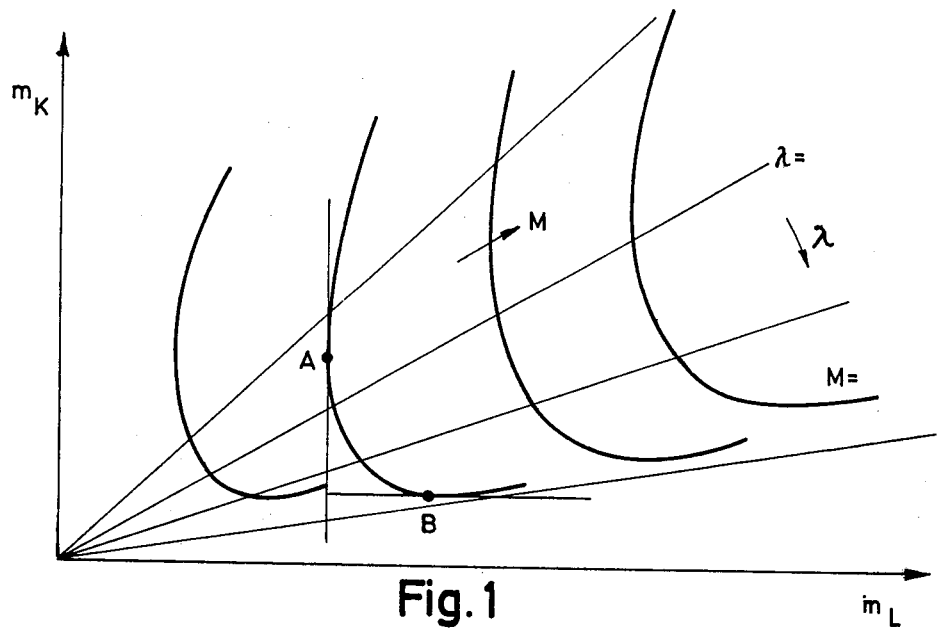
FIG. 1 is a diagram showing the fuel quantity per unit time as a function of the air quantity per unit time including a family of curves of constant torque and a family of curves of constant fuel-air ratio (constant air number $\lambda$)

Turning now to FIG. 1, there is seen the dependence of the fuel quantity per unit time $m_k$ as a function of the processed air quantity $m_L$ in the same time interval. The figure includes families of curves of constant torque M. When vertical and horizontal tangents are drawn to these curves, one obtains operational points of constant torque for constant aspirated air quantity (A) or constant fuel rate (B), respectively. The horizontal tangents provide operational points B of minimum fuel consumption at constant fuel rate but varying air quantity, while the vertical tangents to the particular constant torque curve provide operational engine points A of constant aspirated air quantity but changing fuel quantity.

Figure 2:
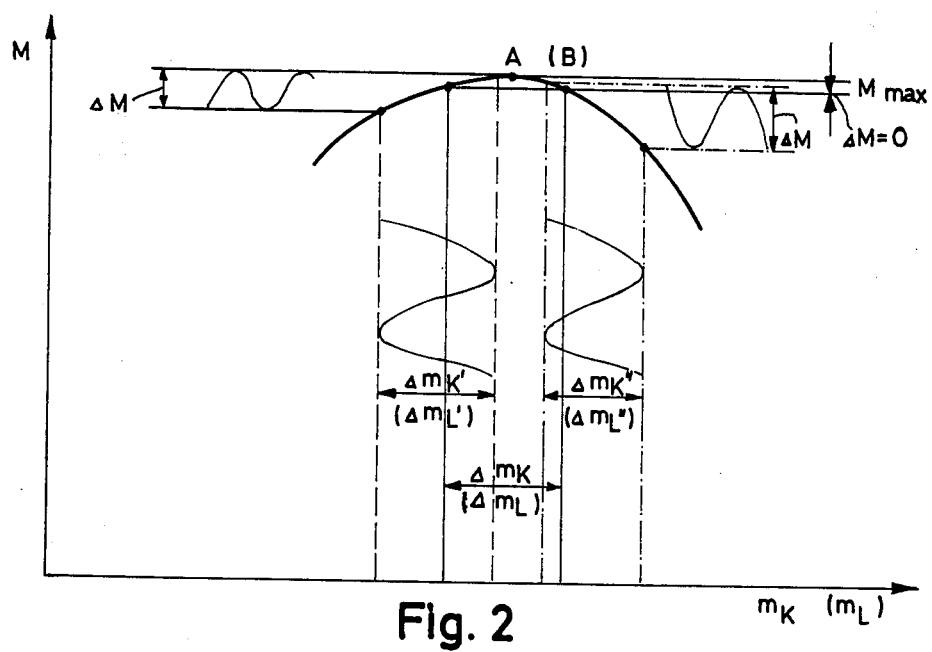
FIG. 2 is a diagram of the engine torque as a function of the changing fuel or air quantity per unit time.

In order to control the operation of the engine to the operational points A (or B), the present invention provides that a certain partial number of the total engine cylinders, for example 2 cylinders in a 4-cylinder engine or 3 cylinders in a 6-cylinder engine, are provided, during one crankshaft revolution, with a clearly leaned-out fuel-air mixture, i.e., a mixture which has less fuel or more air than the average value supplied to the remaining cylinders. During the subsequent crankshaft revolution, these same cylinders are supplied with a richer mixture than the average for the engine. In FIG. 2, both possibilities of control, i.e., at operational points A and B, are accounted for. When the engine operation takes place at the points B (minimum fuel consumption) the applicable legends are those in parentheses.

Thus, the changes in the fuel supply, superimposed on the normal fuel supply, are seen to be r.p.m.-dependent and, if this fuel modulation is performed when the internal combustion engine operates in a region where its power is not optimal, one obtains a finite value of $\Delta M$, whereas $\Delta M = 0$ when the engine operates at optimum power, and hence at a value $\lambda$ which corresponds to optimum power.

The manner of carrying out the modulation of the fuel quantity as described above can be, for example, to provide different injection quantities in two different groups of injection valves when fuel injection is used, but other methods could utilize varying valve cross-sections, varying magnetizing currents in the case of electrically operated valves, different pressure levels or valve opening times, provided all these changes are carried out in a manner synchronous with the engine r.p.m.

When the magnitude of the value $\Delta M$ which occurs during a fuel modulation is measured, it may be used to perform a shift of the center of modulation into the region of optimum engine power.

The apparatus which is used to provide this shift will be explained in more detail in connection with FIG. 3, but it should be mentioned at this point, as may be seen from FIG. 2, that the signals derived from torque changes will have a phase shift of 180° with respect to each other, depending on whether they are derived from operating points lying to the left or to the right, in the diagram, of the region of maximum torque $M_{max}$. For example, if the engine operates at a point lying to the left of point A and if the modulation is performed in a manner resulting in the curve $\Delta m_k$, then as may be seen from the modulations drawn in FIG. 2, for simplification, as sinusoidal waveforms, that when the fuel quantity per unit time increases (richer mixture) there is an increase in torque, as may be seen from reflecting the modulation curve from the torque curve, whereas when the same enrichment takes place during a modulation in the operating region to the right of the maximum, the torque decreases ($\Delta m_k''$). Of course, in a practical embodiment of the invention, the modulation curve would probably be rectangular, or substantially rectangular, due to the manner of modulation described above. If the modulation signals are compared with the resulting torque changes, i.e., if these modulation signals which, according to FIG. 2, represent the change of the fuel quantities in the directions rich/lean are multiplied with the resulting torque changes (increase or decrease), one obtains the sign of the control deviation, i.e., one is able to determine whether the modulation which was performed took place in the region of engine operation lying to the right or to the left of the maximum of the torque curve of FIG. 2. The frequency of occurrence of these algebraic signs of one type or another then is used to control the engine to operate at the optimum operational point.

An analogous method is used when the control process aims at an operational point (point B in FIG. 1) which has the characteristic of minimum fuel consumption. However, in this case, it is the air quantity supplied to a select number of cylinders which is changed or modulated, instead of the fuel quantity. In such a case, one obtains values of the air number $\lambda$ which correspond to a minimum specific fuel consumption whenever the value $\Delta M$ vanishes ($\Delta M = 0$). In this latter case, the cylinders are provided with different air quantities during sequential crankshaft revolutions; this may be achieved, for example, by combining the appropriate induction tubes in a system which has several, for example two, throttle valves. These throttle valves could either have different diameters and be moved together or, if they are of identical size, could be so coupled by a system of rods that the throughput is different. Since the engine itself aspirates the required air quantity, the modulation is inherently performed at a frequency synchronous with the engine r.p.m. Yet another possibility is to provide each cylinder of the engine with separate induction tube regions and throttle valves and the different required air quantities could also be obtained by different throttle valve diameters.

Figure 3:
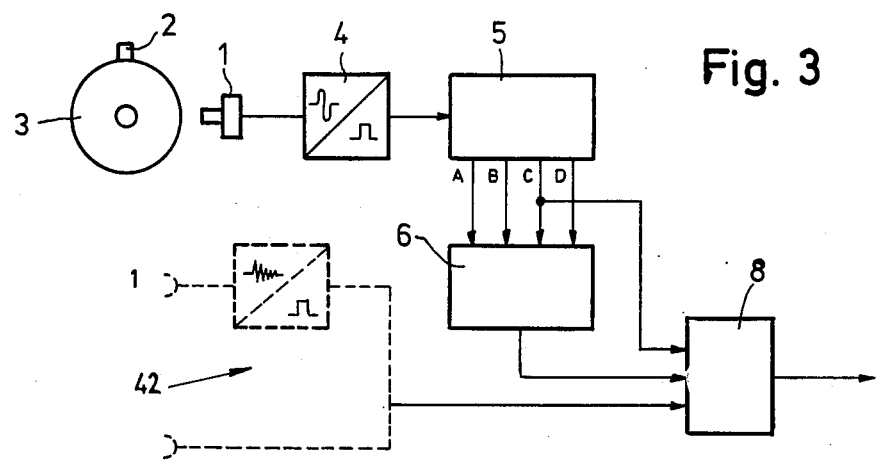
FIG. 3 is a block diagram of a first embodiment of a circuit for carrying out the process of optimum engine control.
Figure 4:
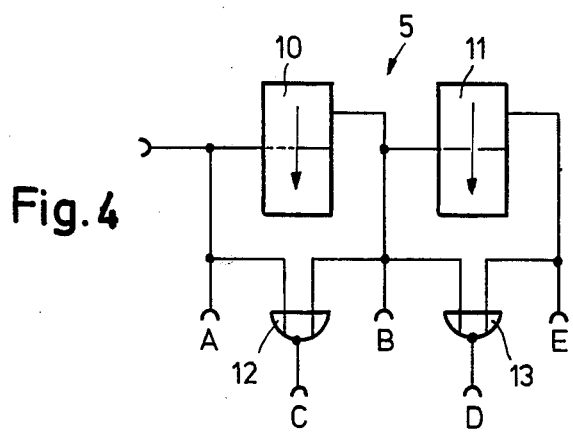
FIG. 4 is a detail of the control logic used in the block diagram of FIG. 3.

In order to carry out the control process described above, use is made of an electronic circuit as shown schematically in FIG. 3. The fluctuations in the torque $\Delta M$ of the engine are sensed by an inductive transducer 1 which senses the passage of a marker 2 affixed to the crankshaft 3 and delivers a pulse to a pulse shaper circuit 4. The shaped pulse, for example a rectangular pulse, is fed to a logical control circuit 5. The logical control circuit uses the output pulse from the circuit 4 to provide a plurality of pulse trains of equal frequency but shifted phase which are, in turn, fed to a processor circuit 6 which uses the pulse train corresponding to the period of revolution of the crankshaft and determines the algebraic sign of any two signals from two sequential periods of revolution of the crankshaft. In particular, one proceeds as follows: The primary signal pulse train A, whose frequency is proportional to the crankshaft r.p.m., is fed to the logical control circuit 5, shown in detail in FIG. 4. This circuit consists of two sequentially connected monostable multivibrators 10 and 11.

Expressed in general terms, the job of the logical control circuit 5 is to produce a number of further pulse trains, related to the primary pulse train A but mutually shifted in phase in a manner such that the subsequent processor circuit is enabled to conduct several mutually harmonized switching and working steps so as to perform a double differentiation as well as a comparison of the algebraic sign of the changes in two sequential periods of revolution of the crankshaft. To perform this task, the primary pulse train A coming from the pulse shaper 4 is fed to a first monostable multivibrator 10 whose output carries the pulse train B, which is shifted in phase with respect to the primary pulse train A by the duration of the pulse width. The same thing happens to the pulse train B, which is fed to the subsequent monostable multivibrator 11 and whose output carries the output pulse train E, also shown in the pulse timing diagram of FIG. 5. By suitable combination of the pulse trains A, B and E, further pulse trains C and D are generated by feeding the pulse trains A and B to a NOR gate 12 and by feeding the pulse trains B and E to a NOR gate 13. The pulse train A is the primary pulse train coming from the pulse shaper circuit 4.

The particular kind and shape of the pulse trains generated by the logical control circuit 5 is not of significance. It is required only that these pulse trains be mutually phase-shifted and that there be two operating pulse trains and two switching pulse trains (for driving the processor circuit 6). Furthermore, the switching pulse trains, exemplified here by the pulse trains C and D, must have generally the opposite sense as the working pulse trains A and B, for reasons to be explained below.

Figure 6:
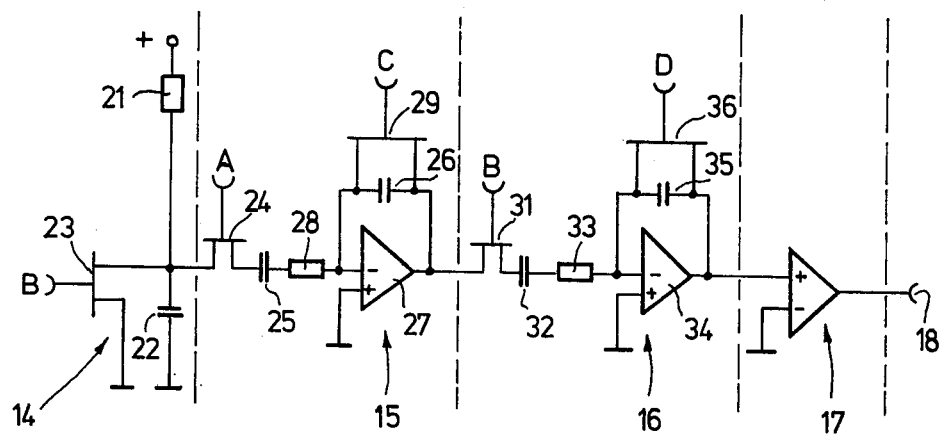
FIG. 6 is a detailed circuit diagram of the processing circuit in the block diagram of FIG. 3.
Figure 7:
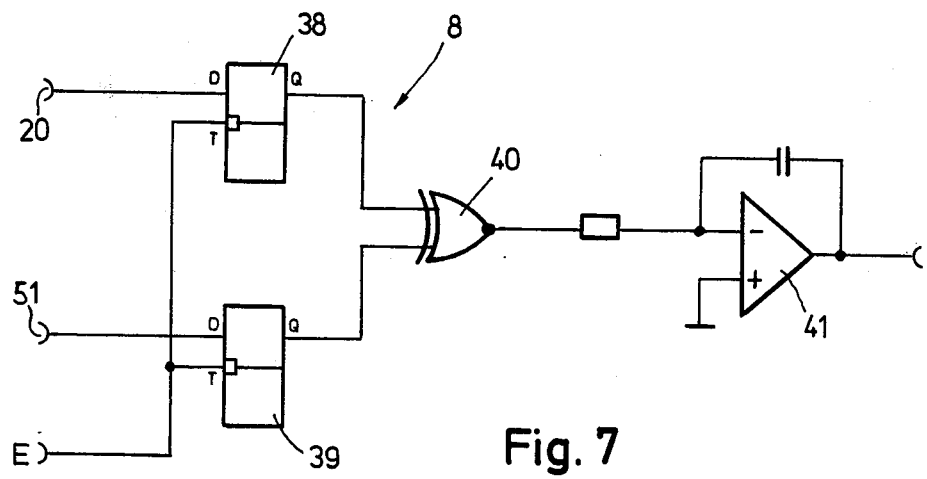
FIG. 7 is a schematic diagram of the control circuit connected to the processing circuit of FIG. 6.

The processor circuit, shown in detail in FIG. 6, is constructed as follows. A sawtooth generator 14 feeds into a first differentiator 15 and subsequently into a second differentiator 16 whose output signal is provided to a comparator circuit 17. The output signal 18 from the entire processor 6 is fed to one of three inputs of the control circuit 8, shown schematically in FIG. 7.

Returning now to FIG. 6, the sawtooth generator 14 may, in the simplest case, consist of a capacitor 22 connected through a resistor 21 with a supply voltage, and a switch 23 connected in parallel with the capacitor. In the exemplary embodiment shown, the switch is a semiconductor switch, in particular a field effect transistor. Since the remaining switching elements in the processor circuit 5 are all shown as field effect transistors, they will be so referred to, however it should be understood that, in principle, any suitable switch could be used.

The field effect transistor 23 is controlled by the pulse train B which is phase shifted by the width of one pulse with respect to the primary pulse train A, as has been previously described. At the arrival of each pulse, the field effect transistor 23 becomes conducting and provides a discharge path for the capacitor 22, whereas when the field effect transistor 23 is blocked, i.e., when no pulse from the pulse train B is present, the capacitor 22 charges through the resistor 21 to a potential whose magnitude is determined by the relative separation of two sequential pulses in the pulse train B. Thus, it may be observed that the potential at the capacitor 22 is proportional to the period of revolution of the crankshaft in the internal combustion engine.

Figure 5:
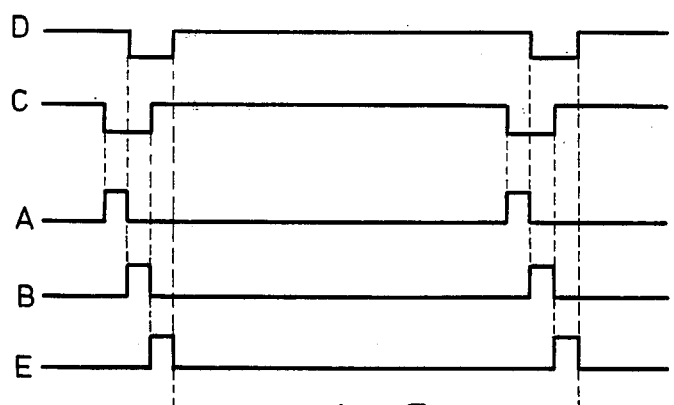
FIG. 5 is a pulse timing diagram of the pulses obtained by the control logic of FIG. 4.

As may be seen from the timing diagram of FIG. 5, just prior to the arrival of the next B pulse at the field effect transistor 23, which would render it conducting, the gate of the field effect transistor 24 receives a pulse from the pulse train A which connects one electrode of a capacitor 25, connected in series with the field effect transistor 24, to the potential-carrying electrode of the capacitor 22. This potential, which derives from the previous cycle, causes a differential current to flow into a capacitor 26, connected in parallel with an operational amplifier 27 belonging to the first differentiating circuit 15. This differential current is related to the systematic fluctuations caused by the deliberate modulation process described above. In other words, the series connection of the capacitor 25 and the subsequent resistor 28 differentiates the potential difference between the two capacitors 22 and 25, and the integral value generated by the capacitor 26, due to the inflowing current, is proportional to the differentiated voltage pulse. The gain of the operational amplifier is assumed to be sufficiently high in each instance.

As may be seen in the pulse timing diagram of FIG. 5, a field effect transistor 29, which is connected in parallel to the capacitor 26, is blocked during the time of occurrence of the A and B pulses, so that the charge on the capacitor 26 is maintained until another B pulse arrives which, as has already been explained, discharges the capacitor 22 of the sawtooth generator and, at the same time, by causing conduction of a field effect transistor 31 connected in series with the first differentiator 15, transmits the once-differentiated signal stored in the capacitor 26 to a second differentiating capacitor 32. The capacitor 32 is a part of the second differentiating circuit 16 which is identical in construction to the first differentiating circuit 15. The process already described with respect to the first differentiator is repeated in the second differentiator, thus again generating a differential current which is stored in a capacitor 35 connected in parallel with an operational amplifier 34 and parallel to a fifth field effect transistor 36. The field effect transistor 36 is controlled by the pulse train D, which has a negative or low potential which blocks the field effect transistor 36 during the time that a pulse B is present. Thus, during the time when the conducting field effect transistor 31 permits a transfer and differentiation of the potential from the capacitor 26 to the capacitor 35. As soon as the B pulse is terminated, the C pulse re-assumes a positive potential (until the arrival of the next A pulse), so that the field effect transistor 29 remains conducting at this time and forms a current path parallel to capacitor 26, holding it completely discharged and protecting it against disturbing influences of any kind.

Thus, in summary, the circuit shown in FIG. 6 performs the following task: Depending on whether the potential on capacitor 22 or capacitor 25 is larger at the time of arrival of an A pulse, (representing a comparison of the just completed period of crankshaft revolution with the preceding period), there is a differential current flow in one direction or the other which is translated into proportional voltages in the storage capacitors 26 and 35, and these voltages are differentiated when being transferred to the next stage. Thus, the comparator circuit 17 provides information regarding the algebraic sign of the changes in two sequential periods of revolution of the crankshaft but, furthermore, the double differentiation filters out any disturbing influences, including that due to any uniform accelerations or decelerations (and these are the only ones normally occurring in the operation of a motor vehicle). Thus the processor circuit 6 responds exclusively to changes in acceleration of crankshaft which are due to the deliberate external modulation of the fuel quantity or the air quantity as described above.

The electrical signal occurring at the output of the comparator circuit 17 is a positive or negative voltage which could be used as a digital signal corresponding to a logical 0 or 1. This signal is fed, as already mentioned, to a first input 20 in a control circuit 8 shown in FIG. 7. The control circuit includes two input storage circuits which might be embodied as bistable multivibrators and whose actual construction need not be further discussed. These storage circuits, designated 38 and 39, respectively, substantially serve to take the voltage present at the input 20, which represents the algebraic sign of the current change in the period of revolution, and transmit it to a subsequent multiplier circuit 40 at the same time as a modulation voltage, present at the input 51 is also transmitted to this multiplier circuit. The logical level of the digital signal at the input of the storage circuit 39 characterizes the temporal sequence of "lean" or "rich" operational cylinders. Thus, the potential carried at the input 21 is an alternating signal of period 2T, i.e., its frequency is one-half the r.p.m. and may be derived in different ways, for example from the ignition voltage or from some other local voltage in the system, for example from an electronically controlled fuel injection system. This signal sequencer is designated generally with the numeral 42 in FIG. 3. The potentials present at the inputs 20 and 51 are transmitted simultaneously, due to the simultaneous activation of the set inputs of the storage circuits 38 and 39 with the pulse train E, which is always present at the output of the second monostable multivibrator 11 in the logical control circuit 5.

As may be observed, the signal on the capacitor 35 is thereby transmitted via the comparator circuit 17 to the storage 38 before the gate of the field effect transistor 36 is raised to a high potential by the pulse train D and thus becomes conducting.

The digital multiplier circuit 40 which, in the present exemplary embodiment, is an exclusive OR gate, carries at its output a logical 0 if two inputs are equal and a logical 1 if they are different. In the present case, an output "0" means that the operational point of the engine is to the left (to the right for air control) of the operational power maximum and a logical "1" implies an operational point to the right (to the left in the case of air modulation) of the point of optimum power. This signal is then integrated in a subsequent integrator 41 so that the output of the integrator carries a signal implying the command "richer" or "leaner," depending on the number of times the particular type of signal occurs. In general, the output voltage of the integrator 41 will be substantially "0" only if, as may be seen with the aid of FIG. 2, the modulation process is performed by an amount $\Delta m_k$ whose amplitude is symmetric with respect to the point of maximum power so that $\Delta M$ is 0. The output signal from the integrator 41 can be fed, in appropriate manner, to the multiplication stage of an electronic fuel injection system, but it can also be used in some other known manner to activate a servo link to execute the enrichment or leaning-out commands referred to above.

By making appropriate changes in the electronic circuitry, it is possible to control the engine to run at other operational points than those described, i.e., those in which power and fuel consumption are optimized. For example, such a point may be a particular type of exhaust gas composition. Combinations of control processes for alternative control of operational points A and B in FIG. 1 are also conceivable.

Figure 8:
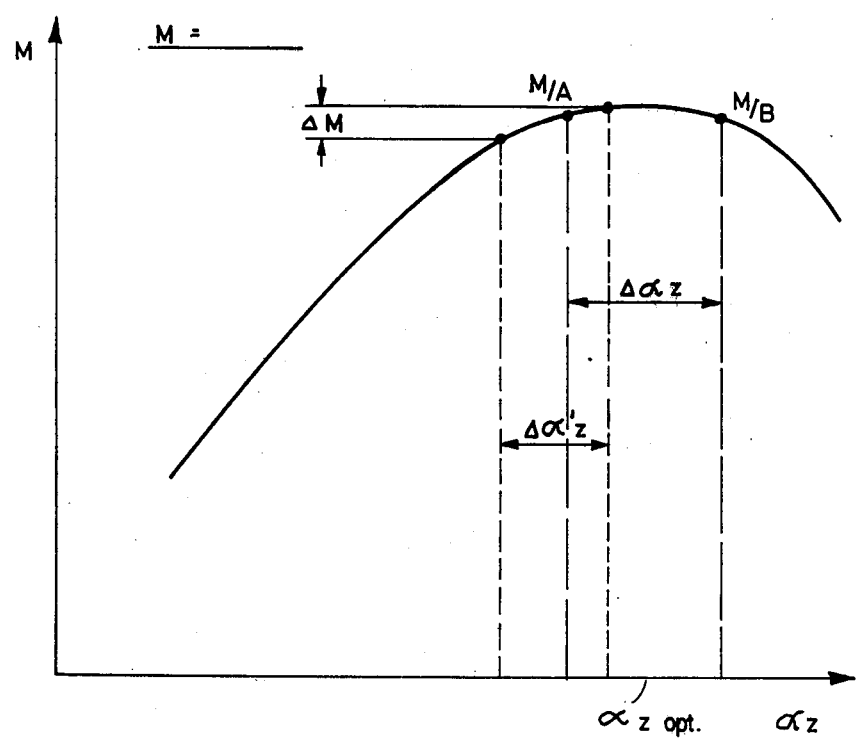
FIG. 8 is a further diagram of the engine torque as a function of ignition angle.

A variant embodiment, satisfying the criteria developed above, for performing an engine control in which power is optimized by adjusting the ignition timing or angle, will now be described with the aid of FIGS. 8 and 9. FIG. 8 is a diagram of the engine torque as a function of a change in the ignition angle $\alpha_Z$ at constant r.p.m. The previous explanations of the foregoing figures permit a simplified description of FIG. 8; if the ignition angle domain is modulated with an amplitude $\Delta\alpha'_Z$, the engine reacts by delivering an appropriate change in the torque $\Delta M$; if the modulation takes place with a value $\Delta\alpha_Z$, then $M_A = M_B$ and the ignition angle $\alpha_Z$ is that for which power is optimized, i.e., maximum. Thus, it may be seen that, in this case as well, there is a systematic modulation of the ignition angle by a value $\Delta\alpha_Z$, whose total amplitude may be, for example, 4° to 8° of crankshaft rotation. The maximum-value control process described above may, in principle, also be used here to obtain an ignition angle which is optimized for maximum power and simultaneously for minimum fuel consumption. In such a control process, one takes due account of the dependence of the optimum ignition angle on r.p.m., induction tube pressure, engine temperature and other technical engine characteristics. The only difference between this process and the control process described above for obtaining engine operation at optimum power by changing the air or fuel supply is that, when ignition angle optimization is used, the modulation frequency $f_m$ follows the general function $f_m = (f \text{ rpm}/4n)$. If the number 2 is used in the denominator of this formula, the formula is also valid for the control process described earlier. When the modulation frequency has the above value, in which $n$ is an integer, any lack of symmetries which may occur in the operation of an internal combustion engine, for example, unequal charging of individual cylinders, can be suppressed.

In a four-cylinder engine, where each plug fires only after the completion of two crankshaft revolutions, the modulation frequency based on the r.p.m. ($f$ r.p.m. = $n/60$), assuming that $n = 1$, is lowered by the factor 4, thereby arriving at a modulation frequency of $f_m = n/240$. Of course, any desired adaptation is possible.

Figure 9:
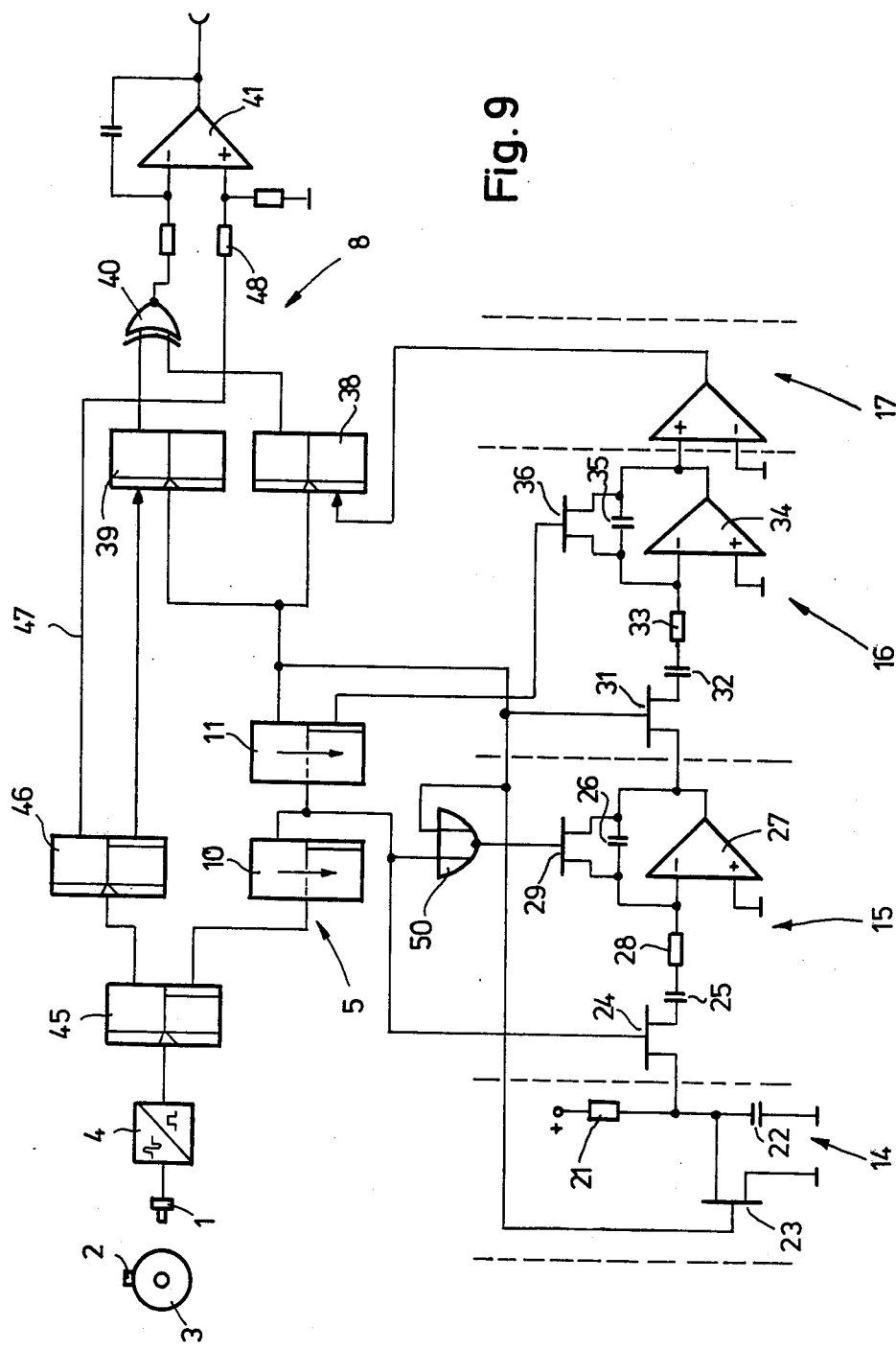
FIG. 9 is a variant embodiment of a circuit for the optimum adjustment of the ignition angle of an internal combustion engine.

FIG. 9 is a circuit diagram of the logical control circuit in the embodiment of the invention which optimizes ignition angle. It may be seen that substantial portions of the circuit in FIG. 9 are identical to those of the circuit in FIG. 3 and those in FIGS. 4–7. Such identical portions retain the same reference numerals which they had before. The only difference is that two supplemental bistable flip-flops 45 and 46 are provided to reduce the modulation frequency appropriately for this special case. The output signal from the integrator 41 of the control circuit 8 includes both the modulation stage as well as the correction stage and engages directly in an electronic ignition angle adjustment device and hence provides the total information required to set the ignition angle of the engine.

The system shown in FIG. 9 is a closed loop since one of the inputs of the operational amplifier connected as an integrator at the output of the control circuit receives the modulation signal via the second divider stage of the bistable multivibrator (or the bistable flip-flop) 46, the connecting line 47, and the resistor 48. The correction signal is fed to the integrator via the circuit shown in the bottom half of FIG. 9, whose function and construction need not be discussed in detail because it is substantially identical to that described in connection with the foregoing example.

A minor difference from previously described circuitry is that the pulse sequences which control the processor circuit, while also being derived by the series connection of two monostable multivibrators 10 and 11 from one of the output sequences of the first supplementary bistable multivibrator 45, are derived in a somewhat different combination. What is essential here is only that the control of the field effect transistors 29 and 36, which cancels the content of capacitors 26 and 35, respectively, occurs in the opposite sense of the field effect transistors 24 and 31 which propagate the signal. In the exemplary embodiment of FIG. 9, the complementary output of the final monostable multivibrator 11 is also used, therefore one of the previously described NOR gates in the control circuit of FIG. 4 may be dispensed with and only a single NOR gate 50 is required.

The ignition angle of the engine may, however, be modulated by incorporating a deliberate asymmetry in the cam of the ignition distributor or else by engaging the basic setting of the distributor, for example by a stepping switch actuated by a linear magnet in mechanical ignition distributors, or by influencing an electrically operating adjustment mechanism.

It should be mentioned that in case $n$ is greater than 1, a special method of modulation may be required. If this method can be embodied electrically, for example by electrical adjustment of the ignition timing or by electrical fuel injection, then substantially less difficulty arises than if mechanical steps are necessary, for example if the air quantity must be changed, but even that change may be achieved, if necessary, with the aid of a magnetic valve connected in parallel to the throttle valve.

What is claimed is:

1. A method for controlling an internal combustion engine comprising the steps of
    modulating the magnitude of an engine control variable at a frequency locked to the engine speed;
    measuring the resultant variation in crankshaft acceleration;
    comparing the phase of the modulation with the phase of the resultant crankshaft acceleration;
    adjusting the magnitude of an engine control variable according to said comparison of phase.

2. A method as defined by claim 1, wherein said measuring of the crankshaft acceleration is performed with electro-inductive means and wherein the resulting induced signal is differentiated twice before said phase comparison.

3. A method as defined by claim 1, wherein said measuring of the crankshaft acceleration is performed by generating signals due to crankshaft marker passing stationary electro-inductive means and by transferring these signals to circuit means containing capacitors for mathematical differentiation and said signals are compared with similar signals from previous crankshaft revolutions.

4. An apparatus for controlling an internal combustion engine comprising:
    modulator means for periodic alteration of an engine variable;
    detector means for detecting the resulting alteration in engine performance;
    means for comparing the engine performance with set-point data, including
        a logical circuit for producing phase-shifted signal trains,
        a subsequent processor circuit for processing and comparing signals, and a subsequent controller for adjusting and regulating said engine variable, and
    control means for changing an engine variable according to the results of comparisons performed by said means for comparing engine performance.

5. An apparatus as defined by claim 4, wherein said detector means includes an electro-inductive sensor cooperating with the engine crankshaft for producing a signal related to crankshaft phase and timing, said apparatus further comprising a pulse shaping circuit.

6. An apparatus as defined by claim 5, wherein said logical circuit includes at least two sequentially connected mono-stable multivibrators which produce complementary output pulse sequences which are fed as control pulses to said processor circuit.

7. An apparatus as defined by claim 5, wherein at least two of the pulse sequences generated by said logical circuit are in opposite phase to the remaining pulse trains.

8. An apparatus as defined by claim 7, wherein said processor circuit includes at least two storage capacitors and a switch connected in parallel with each of said capacitors and wherein said switches are controlled by said complementary pulse trains.

9. An apparatus as defined by claim 7, wherein said logical circuit includes at least two Nor-gates and one input of each Nor-gate is driven by the input signal to the respective mono-stable multivibrator and the second input is controlled by the output of the respective mono-stable multivibrator and wherein the outputs of the Nor-gates produce said pulse trains.

10. An apparatus as defined by claim 4, further comprising two bi-stable flip-flops connected to said detector means and a signal from the first of said bi-stable flip-flops is fed to said logical circuit.

11. An apparatus for controlling an internal combustion engine comprising:
    modulator means for periodic alteration of an engine variable;
    detector means for detecting the resulting alteration in engine performance;
    means for comparing the engine performance with set-point data, including
        a logical circuit for producing phase-shifted signal trains,
        a subsequent processor circuit for processing and comparing signals, and a subsequent controller for adjusting and regulating said engine variable, said processor circuit including a saw-tooth generator in which a capacitor is charged in proportion to the period of crankshaft revolution and two differentiating circuits connected in series; and
    control means for changing an engine variable according to the results of comparisons performed by said means for comparing engine performance.

12. An apparatus as defined by claim 11, in which said capacitor of said saw-tooth generator is connected by a resistor to a voltage source and parallel to said capacitor is connected a first semiconductor switch which is controlled at crankshaft periodic intervals by one of said pulse trains from said logical circuit.

13. An apparatus as defined by claim 12, wherein said capacitor of said saw-tooth generator is connected in series with a second semiconductor switch controlled by a second one of said pulse trains and said processor circuit includes a further capacitor connected in series with said second semiconductor switch and a resistor connected in series with said second capacitor and further includes an erasable storage circuit means.

14. An apparatus as defined by claim 13, in which said erasable storage circuit means includes a third capacitor in parallel with a third semiconductor element controlled by a third one of said pulse trains and said processor circuit further includes an operational amplifier connected in parallel with said third capacitor; whereby the connection of said first and second capacitors creates a differential current which is stored in said third capacitor.

15. An apparatus as defined by claim 14, in which said processor circuit includes first and second differentiating circuits for eliminating portions of the signal due to uniform engine accelerations, and includes a fourth storage capacitor connected in parallel with a fifth semiconductor switch and further includes a fourth semiconductor switch for transmitting the signal and controlled by one of said pulse trains.

16. An apparatus as defined by claim 15, wherein said processor circuit further includes a comparator circuit whose output is an algebraic sign signal indicative of the direction of the change of the period of crankshaft revolution.

17. An apparatus for controlling an internal combustion engine comprising:
 modulator means for periodic alteration of an engine variable;
 detector means for detecting the resulting alteration in engine performance;
 means for comparing the engine performance with set-point data, including
  a logical circuit for producing phase-shifted signal trains,
  a subsequent processor circuit for processing and comparing signals, and a subsequent controller for adjusting and regulating said engine variable,
  a multiplier circuit fed by said processor circuit and by said modulator means;
  an integrating circuit connected to the multiplier circuit;
 control means for changing an engine variable according to the results of comparisons performed by said means for comparing engine performance; and
 a final control element actuated by said integrating circuit, whereby said final control element alters engine variables to obtain optimum engine operation.

18. An apparatus as defined by claim 17, wherein said multiplier circuit is an exclusive Or-gate and said circuit further includes two bi-stable flip-flops, one of which receives the output signal from said processor circuit and the other of said flip-flops receives the signal from said modulator means and the said inputs of both flip-flops are connected to said pulse trains from said logic circuit.

19. An apparatus for controlling an internal combustion engine comprising;
 modulator means for periodic alteration of an engine variable;
 detector means for detecting the resulting alteration in engine performance;
 means for comparing the engine performance with set-point data, including
  a logical circuit for producing phase-shifted signal trains,
  a subsequent processor circuit for processing and comparing signals, and a subsequent controller for adjusting and regulating said engine variable;
  two bi-stable flip-flops connected to said detector means, with a signal from the first of said be-stable flip-flaps being fed to said logical circuit;
  an integrator connected to said multiplier circuit, said integrator receiving the output signal from said second bi-stable flip-flop, whereby the output of the integrator is an immediate measure of the modulation signal and any correction signal; and
 control means for changing an engine variable according to the results of comparisons performed by said means for comparing engine performance.

* * * * *